US007536605B2

(12) United States Patent
Keaffaber et al.

(10) Patent No.: US 7,536,605 B2
(45) Date of Patent: May 19, 2009

(54) INJECTION OF SOFTWARE FAULTS INTO AN OPERATIONAL SYSTEM

(75) Inventors: Todd Keaffaber, Plano, IL (US); Douglas A. Kimber, Batavia, IL (US)

(73) Assignee: Alcatel-Lucent USA Inc., Muray Hill, NJ (US)

( * ) Notice: Subject to any disclaimer, the term of this patent is extended or adjusted under 35 U.S.C. 154(b) by 575 days.

(21) Appl. No.: 11/136,861

(22) Filed: May 25, 2005

(65) Prior Publication Data
US 2006/0271825 A1 Nov. 30, 2006

(51) Int. Cl.
*G06F 11/00* (2006.01)
(52) U.S. Cl. .................. 714/41; 717/124; 714/25; 714/38; 714/45
(58) Field of Classification Search .......... 714/41
See application file for complete search history.

(56) References Cited

U.S. PATENT DOCUMENTS

| | | | | | |
|---|---|---|---|---|---|
| 4,034,195 | A | * | 7/1977 | Bates ........................... | 714/46 |
| 4,414,628 | A | * | 11/1983 | Ahuja et al. ................. | 715/807 |
| 5,001,712 | A | * | 3/1991 | Splett et al. ................. | 714/703 |
| 5,274,825 | A | * | 12/1993 | Lemay et al. ................ | 710/268 |
| 5,612,869 | A | * | 3/1997 | Letzt et al. ...................... | 705/3 |
| 5,671,352 | A | * | 9/1997 | Subrahmaniam et al. ...... | 714/41 |
| 6,067,639 | A | * | 5/2000 | Rodrigues et al. ............. | 714/38 |
| 6,247,148 | B1 | * | 6/2001 | Annicchiarico et al. ....... | 714/45 |
| 6,477,666 | B1 | * | 11/2002 | Sanchez et al. ............... | 714/41 |
| 6,519,718 | B1 | * | 2/2003 | Graham et al. ............... | 714/41 |
| 6,539,503 | B1 | * | 3/2003 | Walker ........................ | 714/703 |
| 6,553,439 | B1 | * | 4/2003 | Greger et al. ................. | 710/62 |
| 6,795,873 | B1 | * | 9/2004 | Barth et al. ................... | 710/15 |
| 6,889,342 | B2 | * | 5/2005 | Neudeck ....................... | 714/42 |
| 6,971,048 | B1 | * | 11/2005 | Hanson et al. ................ | 714/41 |
| 2002/0133754 | A1 | * | 9/2002 | Adams ......................... | 714/42 |
| 2003/0101382 | A1 | * | 5/2003 | Gabele et al. ................. | 714/39 |
| 2003/0145249 | A1 | * | 7/2003 | Wilson et al. ................. | 714/25 |
| 2004/0078696 | A1 | * | 4/2004 | Bowers et al. ................ | 714/41 |
| 2004/0243882 | A1 | * | 12/2004 | Zhou ........................... | 714/38 |
| 2005/0015702 | A1 | * | 1/2005 | Shier et al. ................... | 714/776 |
| 2005/0027973 | A1 | * | 2/2005 | Barry et al. .................. | 712/233 |
| 2005/0273528 | A1 | * | 12/2005 | Adams ......................... | 710/57 |
| 2006/0143540 | A1 | * | 6/2006 | Burk ............................ | 714/41 |

OTHER PUBLICATIONS

Hsueh et al., "Fault injection techniques and tools", Computer, vol. 30, Issue 4, Apr. 1997 pp. 75-82 Digital Object Identifier 10.1109/2.585157.*
Han, Seungjae et al., "Doctor: an integrated software fault injection environment for distributed real-time systems", Computer Performance and Dependability Symposium, 1995. Proceedings., International Apr. 24-26, 1995 pp. 204-213.*

* cited by examiner

*Primary Examiner*—Scott T Baderman
*Assistant Examiner*—Chae Ko

(57) ABSTRACT

A method is provided for injecting faults into an operational system containing software and hardware components to be tested. A fault injection routine is stored in a memory location of the system. An interrupt service routine, preferably operational during normal operation of the system is provided with a pointer to the fault injection routine. A fault injection routine is executed from within the interrupt service routine. In one embodiment, the interrupt service routine provides a clock or timing function. In another embodiment, a number of fault injection subroutines are accessible by the fault injection routine. A value is passed to the fault injection routine indicating the particular fault injection subroutine to be employed.

30 Claims, 6 Drawing Sheets

INJECTION OF SOFTWARE FAULTS INTO AN OPERATIONAL SYSTEM

TECHNICAL FIELD

The invention relates generally to software testing and more particularly to the injection of software faults into an operational system.

BACKGROUND

Software testing, which documents that a piece of software is operating correctly, is an important component of software development, and is often the most costly part of the process. After the developer is satisfied that the finished software product will operate satisfactorily under normal operating conditions, the software is turned over to testers who will run a set of tests to examine the performance of the software when known errors or faults are intentionally injected into the operational system.

It is important, in one aspect of testing, that the operational system will not be altered by the process of injecting the one or more faults. Frequently, the presence of injected faults in the operational system will not immediately affect the system operation, unless that is the objective of the tests being performed. Rather, some time may pass, and a number of processor instructions may have to be carried out before the faults manifest and the system is made to undergo influence of the injected faults. Thus a need exists during this waiting time, that the operational system will not be prematurely altered, and that alterations to normal system operation are the results solely of the injected faults.

Software fault injection is a method that may be used to test the resiliency of a system's software to a variety of faults. It is frequently used to identify a system's software fault vulnerabilities, in order to improve the software to remove flaws prior to delivery to the customer. Known methods to inject faults include entering commands from the command line of a console. Entering commands from the command line of a console requires that the system have a minimum input/output capability such as a user operable console from which to enter commands. Unfortunately, this type of capability is lacking in many practical systems which require testing by fault injection.

Other known methods to inject faults include either entering faults from an attached software debugger or creating faults from special debugger software written specifically for a single dedicated purpose, with the faults being typically invoked by commands from an attached software debugger. Both of these techniques require the use of a software debugger, and accordingly may require special training, special debugger hardware, and possibly debugger software licenses. Additionally, some debuggers require that the software be stopped prior to injecting the fault, and then re-started after the fault is in place, thus significantly altering the real-time behavior of the system. Debuggers also tend to need human input, which causes their use to be labor intensive and slower. Thus there is a need to eliminate debugger software or hardware, and subsequently avoid the need to address issues described with the debugger's use.

SUMMARY

The invention in one implementation encompasses a method. The method, in one instance, is directed to selectively injecting faults, through a system interrupt, utilizing fault-injecting software previously stored in memory and addressable by the system being tested. In one implementation, the method comprises the steps of storing a fault injection routine in at least one predefined memory location; providing a pointer to the at least one predefined memory location in an interrupt service routine; and executing the fault injection routine.

In another implementation, the method comprises the steps of storing a fault injection routine in at least one predefined memory location; providing a pointer to the at least one predefined memory location in a clock interrupt service routine; and executing the fault injection routine.

Yet another implementation of the invention encompasses a method. The method includes storing a fault injection routine and a plurality of fault injection subroutines for injecting different, respective faults in at least one predefined memory location; selecting at least one of the plurality of fault injection subroutines; providing a pointer to the fault injection routine in an interrupt service routine; and executing the fault injection routine and the at least one selected fault injection subroutine in the interrupt service routine.

Certain faults that are extremely difficult to inject with known techniques are significantly easier to inject with testing according to one or more aspects of the present invention. As a result of simplifying the fault injection process, more fault scenarios can be tested and larger statistical samples for fault scenarios can be collected. The extra testing will allow more bugs and defects to be found in the lab environment during development and testing and will reduce the number of bugs that would need to be diagnosed in the final product that is already deployed in the field. This will result in a significant cost savings since it is much cheaper to find bugs in the labs than it is in the field. It also reduces the risk of a bug causing downtime and the associated penalties.

DESCRIPTION OF THE DRAWINGS

Features of exemplary implementations of the invention will become apparent from the description, the claims, and the accompanying drawings in which:

DETAILED DESCRIPTION

In certain aspects, the present invention is concerned with real-time testing of an operational system. In this manner, behavior of the operational system will closely portray behavior as experienced by a customer or other user, under practical field conditions. The present invention provides heretofore unattainable flexibility including the ability to inject software faults as well as to simulate hardware faults such as a loss of a system clock or a failed serial bus or RS-232 port.

Figure 1:
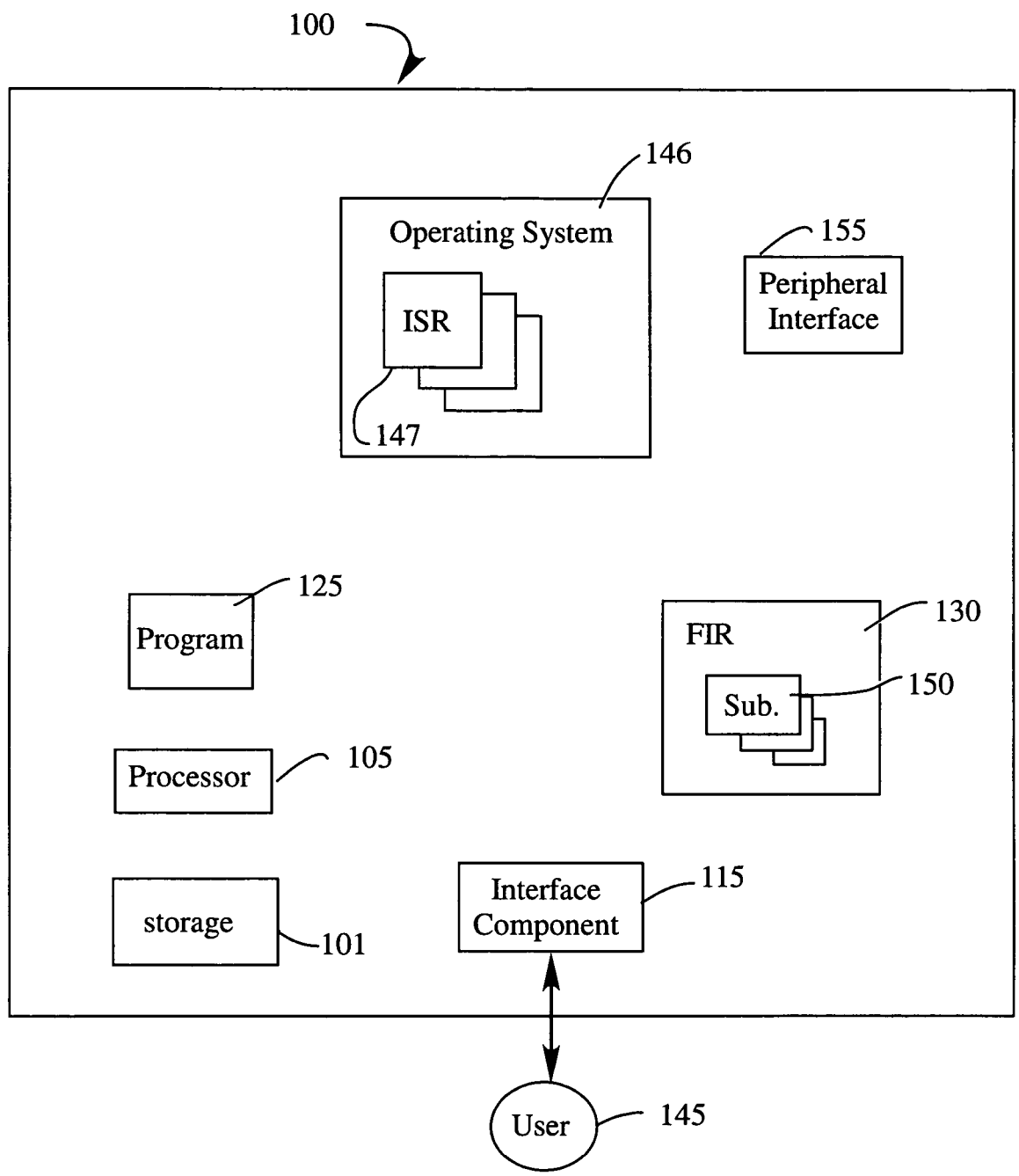
FIG. 1 is a representation of one implementation of an apparatus that comprises one or more storage devices, one or more processors, one or more interface components, one or more programs being tested, one or more interrupt routines, one or more fault injection routines, and one or more fault injection subroutines.

With reference to FIG. 1, an apparatus 100 in one example comprises one or more storage devices 101, one or more processors 105, and one or more interface components 115. The interface component 115, which may comprise input/output resources such as a known display, keyboard, mouse or other pointing device is optional and may be omitted, if desired. The processor 105 in one example comprises a central processor unit ("CPU"). The processor 105 executes one or more instructions of one or more programs 125, one or more interrupt service routines 147, one or more fault injection routines 130 and one or more fault injection subroutines 150.

Processor 105, in one example, operates under control of an operating system 146 which includes one or more interrupt service routines 147. Examples of interrupt service routines, referred to herein also as "interrupt handlers" include: file system I/O interrupt handlers, bus parity error interrupt handlers, software fault exception handlers, floating point exception (such as divide by 0) handlers, page fault exception handlers, DMA Controller interrupt handlers, Serial I/O interrupt handlers and clock/timer interrupt handlers. Interrupts are sometimes referred to as exceptions, especially when they are associated with a software cause instead of a hardware cause. Not all systems will have every one of the above handlers. In one example, interrupt service routines and subroutines may include one or more operational code statements, one or more data statements and one or more processable statements.

Apparatus 100 also includes a peripheral interface 155 for communication with one or more peripheral devices which may be present in a particular instance. For example, the peripheral devices accessed through peripheral interface 155 may include a USB hub or USB device, an ethernet controller, an inter-integrated circuit device having one or more servers, a console or keyboard device each having or otherwise associated with their own memory registers in which a number of values may be stored.

In one example, CPUs of the type in use today (which includes CPUs, microprocessors, and microcontrollers) have the provision for an interrupt, which is an asynchronous event that suspends the normal processing of the CPU and temporarily diverts control to an interrupt service routine or "interrupt handler". An "interrupt handler" is a routine that performs processing specific to the interrupt that occurred. When the interrupt occurs, the CPU will save the information about the current state of the executing program, and then transfer control to the interrupt handler. When the interrupt handler has completed the work associated with the interrupt, it will "return from interrupt". At this point the CPU restores the state of the originally executing program, and that program continues where it left off, before the diversion.

In one example, multiple interrupt sources are provided, such as one or more I/O devices or interfaces, one or more timers, and one or more fault conditions. A mechanism is therefore needed to associate a specific interrupt handler with the particular interrupt it services. Different CPUs accomplish this in different ways. Some CPUs begin executing instructions at an address specific to the interrupt type. Others reference a table. In one example, the CPU uses the interrupt type as an index into a table of pointers called an interrupt vector table. At the index within the interrupt vector table is a pointer to the actual interrupt service routine or interrupt handler. In one example, an "interrupt service routine" includes the routine that is executed when the interrupt occurs, along with any pointers to it that are necessitated by the architecture of an individual CPU.

Figure 2:
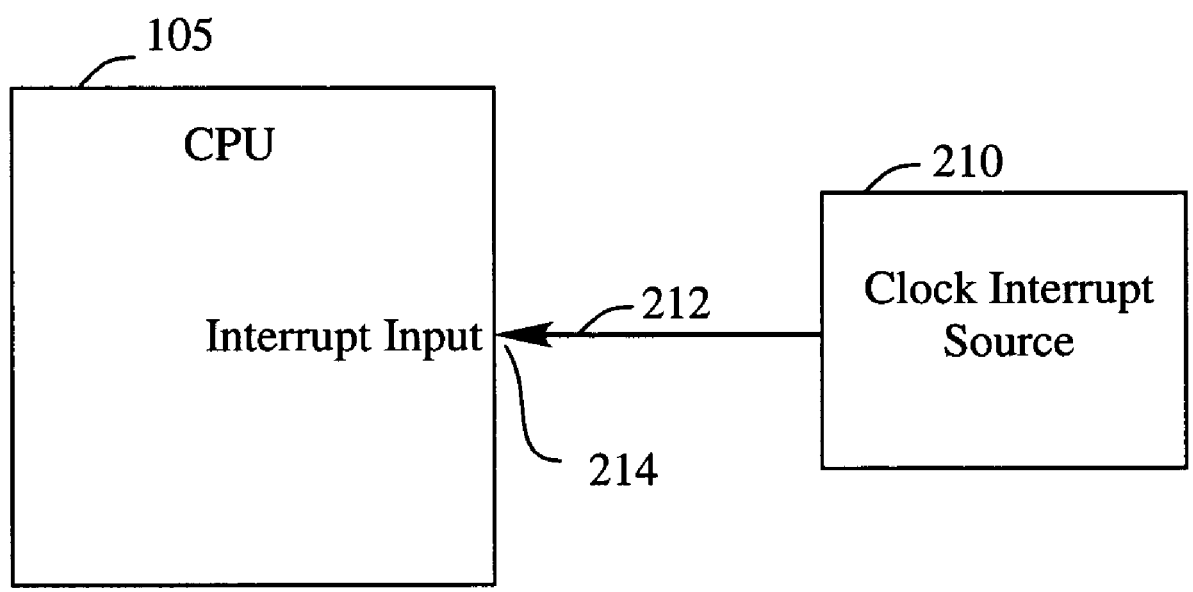
FIG. 2 is a representation of a one implementation of an apparatus that comprises one or more central processing units, one or more interrupt inputs and one or more clock interrupt sources.

Virtually every CPU implementation uses one of the CPU interrupts as a "clock" or "timer" interrupt. This is typically done by connecting some form of oscillator to the interrupt input and there are numerous known ways to generate an interrupt at fixed intervals. With reference to FIG. 2, a timing means, fixed interval circuit or clock interrupt source 210 provides an output on line 212 coupled to interrupt input 214 of CPU 105. Thus, the normal operation, sometimes referred to as a normal program flow, of the software system depicted in FIG. 1 is repeatedly, and normally reliably interrupted by the interrupt source 210 to establish defined operating or clock cycles to provide a system-wide standard timing relied upon by software and hardware components of the system.

In one example, each pulse of the oscillator of interrupt source 210 shown in FIG. 2 causes the CPU 105 of FIG. 1 to suspend the program it is currently executing and to divert control to an interrupt service routine or clock interrupt handler, such as the interrupt service routine 147 shown in FIG. 1. In one example, the clock interrupt handler is provided as part of the operating system 146. In one example, the interrupt handler, in normal operation, increments a clock "ticks" variable. Thus, the "ticks" variable contains a count of how many clock ticks, (and also how many clock interrupts) have occurred since the system was started. Other actions may be to schedule tasks that need to be run at regular intervals, poll for work requests, etc., depending on the particular system. In normal operation, the clock interrupt occurs on a reliable, regular basis, and is often used system-wide as a trigger to invoke various actions within the system.

One example of a testing method uses a hook (or known program entry point), pointer or other memory address device in a real-time clock interrupt service routine, along with a set of pre-defined memory locations (which, in one example, correspond to respective fault injection subroutines), to inject one or more software faults. As contemplated herein, pre-defined memory locations include dynamic as well as static memory locations. In one aspect, the present invention contemplates intervention in a real-time operating system, in which memory locations may be assigned on a dynamic as well as a static basis. In one example, a real-time clock interrupt service routine or interrupt handler will run every tick of the clock. When the service routine runs, it checks one or more current, predefined memory location(s) to determine whether to inject a fault or not. It may be desirable in certain instances to load a predefined fault injection code prior to an execution of the programs and/or operating system to be tested. In other instances, it may be desirable to load a set or family of different fault-defining components in a fault injection code servicing a particular system under test. As contemplated herein, the "fault injection code" includes various programming code, such as fault injection routines, fault injection subroutines, fault selecting routines, and interrupt service routines that may be required to handle the overall fault testing operation, in a comprehensive manner. In this latter example, the entire range of possible faults is provided for ahead of time. In one example, the fault testing can be left in a dormant mode in which the fault type to be executed calls for a null or no-fault routine which injects no faults into the system, allowing the system to operate in a normal manner. In one example, a null fault subroutine is provided so as to be devoid of fault data. Thus, when executed, the no-fault subroutine simply returns without having injected a fault into the operational system. Alternatively, on demand, or upon some predetermined condition, a particular fault can be identified for injection in a subsequent interrupt service routine. If desired, the particular fault can be specified by a pseudo random number generator.

In one example, the memory location(s) indicate a specific fault type to be injected. Although not required, it is generally preferred that the interrupt service routine will be provided as part of the operating system, giving the fault injector full operating system access permissions, and thus being able to inject faults in virtually any part of the system software being tested (which, in one example, comprises either the operating system 146 and/or the program 125). When indication is given that a fault is to be injected, an interrupt service routine operates on one or more fault injection routines and one or more fault injection subroutines to inject one or more faults, and then proceeds with the normal clock tick processing (unless, in one example, the specified fault was to lose a clock tick, in which case the service routine simply returns after consuming one or more clock ticks). The tester then waits for the fault to be manifested in the desired failure mode, upon continued operation of the overall system. If the memory location(s) indicate that no fault is to be injected, then the interrupt service routine performs its normal clock tick processing. In one example, it is generally preferable to inject faults into an operational system, such as during normal operation of the operating system 146 and program 125 illustrated in FIG. 1.

In one example, the present invention finds immediate application in a data processing system having memory accessible by a processor, with the processor executing instructions included within a predetermined instruction set (e.g. program 125 and/or operating system 146) of apparatus 100 which, in one example, represents a data processing system. The processor instruction set includes one or more routines to cause the processor 105 to execute a predetermined instruction sequence retrieved from an addressable or otherwise identifiable portion of the memory. The processor 105 further includes interrupt circuits (such as the interrupt circuit associated with interrupt input 214 shown in FIG. 2) to execute control sequences whereby execution of the processor is re-directed or diverted from the predetermined instruction sequence to an interrupt handler or interrupt service routine upon the occurrence of a predetermined interrupt event.

As mentioned above, the interrupt service routine can be associated with any number of known interrupt arrangements. As contemplated in one example herein, the interrupt arrangement is associated with clock services provided to the overall system, such as a clock interrupt which is provided by the operating system or by normally operating software and which comprises a type of event that temporarily suspends the normally operating flow of instructions, causing a diversion in the flow of instruction execution associated with the clock service. Upon occurrence of the clock interrupt, the processor handling of the execution flow is forced to discontinue execution of that instruction flow and to thereafter begin execution of a different instruction flow, namely one which handles the events causing the clock service interrupt.

In one example, the events causing the interrupt is used to trigger one or more intentional fault injection events, which are predefined by fault injecting code stored in memory accessible to the processor handling the interrupt. Most preferably, the error injecting code is stored in addressable memory. Either the memory location or address of the error injecting code, or a pointer to the memory location or address of the error injecting code is provided to the processor executing the clock interrupt routine.

In one example, the error injecting code comprises one or more fault injection routines and one or more fault injection subroutines, which are operated upon by the one or more fault injection routines under control of the interrupt service routine to inject one or more specifically identified faults into the operational system. The one or more fault injection routines and the one or more fault injection subroutines are, in one example, stored at known different contiguous or noncontiguous memory locations. The memory storage may be associated with the apparatus 100 of FIG. 1, e.g. the storage device 101, or may be associated with memory storage of a peripheral device so as to be accessible to processor 105 through peripheral interface 155.

In one example, a fault injection routine is operatively connected to a clock interrupt service routine. Each time the clock interrupt service routine is entered, the fault injection routine can make a determination whether or not to inject a fault, and if a fault is to be injected, what type of fault to inject. In one example, fault injection service provided according to principles of the present invention are comprised of three components including a triggering component, a fault-defining component and a fault-generating component.

Figure 3:
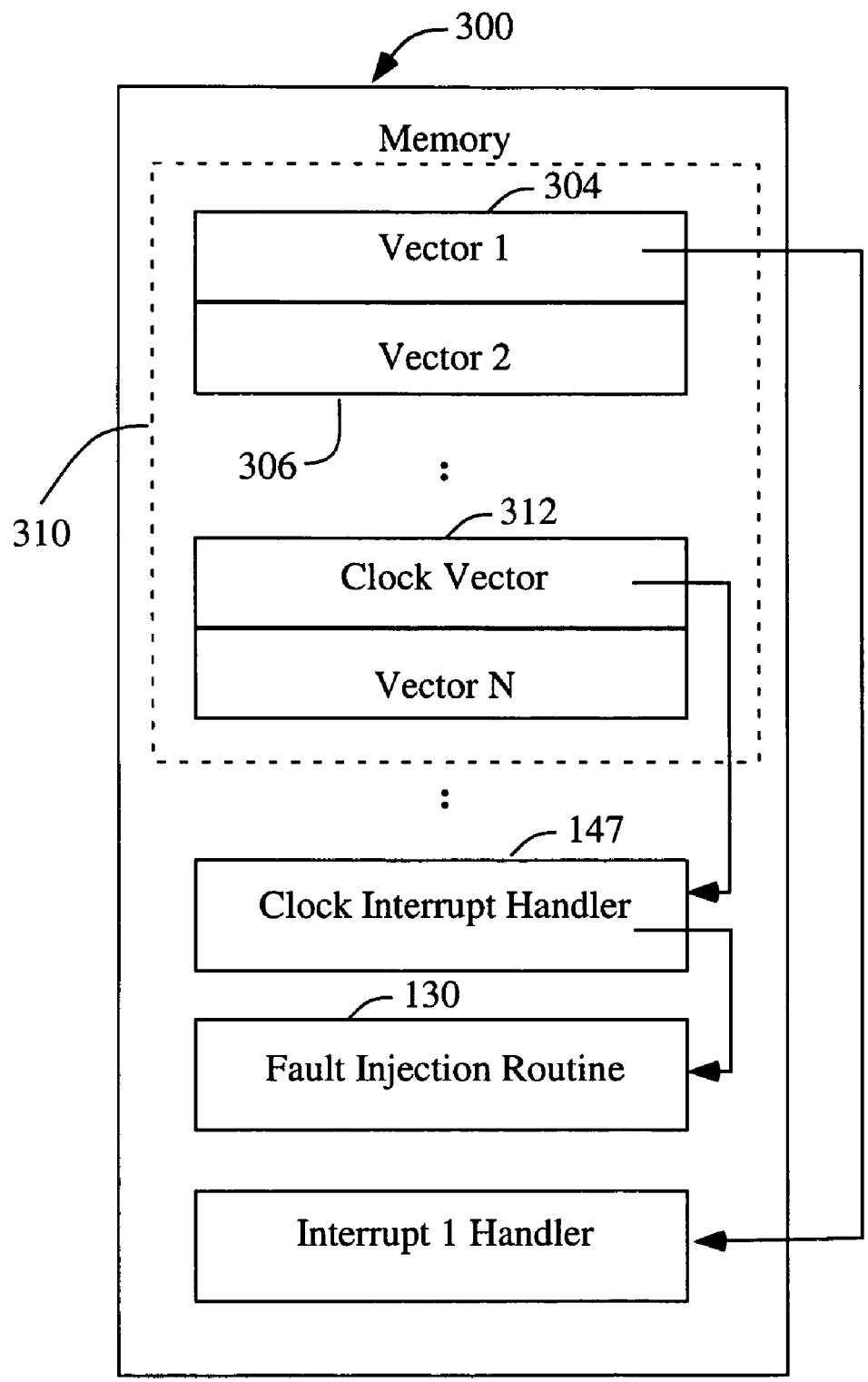
FIG. 3 is a representation of a memory map illustrating one example of an interrupt routine operation of the apparatus of FIG. 1.

Referring now to FIG. 3, it is assumed that the software system and other components of the data processing system represented by the apparatus 100 shown in FIG. 1 is continuing a normal operating mode. Included in the data processing system are one or more software systems and one or more hardware systems which together comprise one or more software or hardware devices to be tested as to their reaction to the presence of a known, predefined injected fault. It is assumed that the interrupt generated by interrupt source 210 shown in FIG. 2 has just occurred. With reference to the memory map 300 represented in FIG. 3, when the clock interrupt occurs, the CPU 105 saves the state of the current process, and retrieves a clock vector pointer 312 from an interrupt vector table 310, after diverting execution to the services stored in preceding vectors 304, 306. The CPU 105 then begins executing the program instructions stored at the memory location pointed to by the clock vector. In one example, the program instructions stored at this address comprise a clock interrupt handler. In one example, the clock interrupt handler or clock interrupt service routine is, in the first instance, provided as part of the operating system 146. In one example, the original clock interrupt handler 147 is modified to include a pointer to a fault injection routine 130, and at some point transfers control to the fault injection routine.

In this simple case, the fault to be injected is predetermined and the fault injection routine simply injects the predetermined fault into the system. In one example, this implementation is particularly useful when it is easy to modify the original clock interrupt handler to point to the fault injection routine. In one example, the user or tester who desires to inject the faults has access to the source code for the original clock interrupt handler. This will be true for many real-time operating systems and open source operating systems, as well as proprietary systems where the developer has rights to use and modify the source code. However, other implementations, such as those represented in FIG. 4 become more attractive in those instances where the developer may not have access to the original source code.

Figure 4:
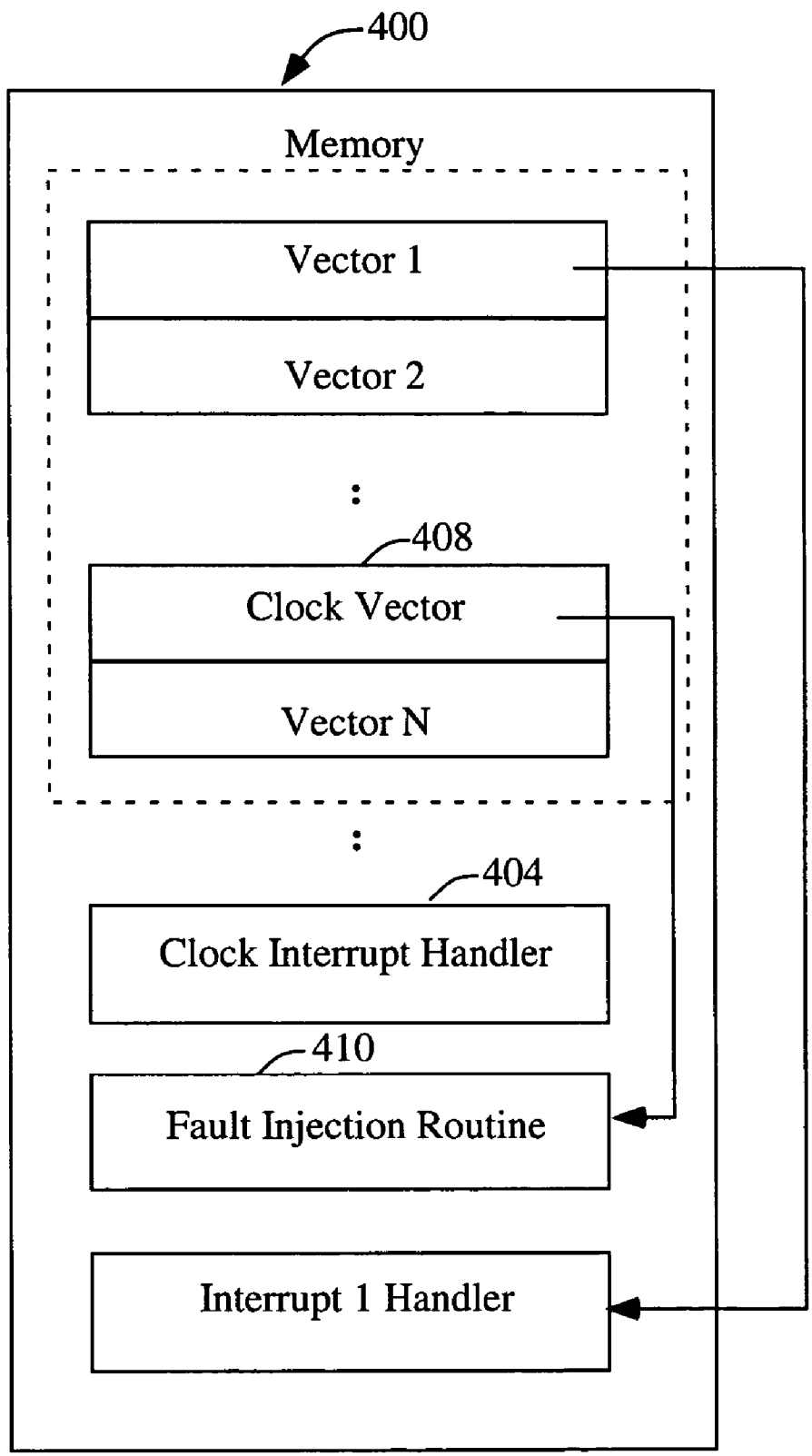
FIG. 4 is a representation of a memory map illustrating another example of an interrupt routine operation of the apparatus of FIG. 1.

In one example of operation, referring to the memory map 400 represented in FIG. 4, the original clock interrupt handler 404 is unmodified, but the clock vector 408 is changed during the system initialization to point to the fault injection routine 410. The original clock vector is saved, and the fault injection routine may then use it to call the original clock interrupt handler, if desired. This implementation avoids the issue of requiring access to the source code for the original clock interrupt handler, but may require additional initialization software to modify the clock vector.

If desired, a similar strategy may be employed for CPUs in another example of operation where vector tables are not used, but where execution is diverted directly to a pre-determined memory location specific to the type of interrupt being serviced. In this example, the original interrupt handler may be modified if source code is available, just as in the vector table example discussed above with reference to the representation of FIG. 3.

In one example, if source code is not available, the beginning instruction(s) of the original handler are replaced with a branch instruction to the fault injection routine, saving the original instruction(s). In one example, this replacement is done during system initialization, and when the fault injection routine has completed its work, it replaces the original instructions in the original clock interrupt handler. In this example, additional steps may have to be taken before allowing the original clock interrupt handler to run. For example, the fault injection routine may have to modify the stack so that, when the original clock interrupt handler executes its "return from interrupt", rather than returning to the originally executing program, control is diverted or otherwise passed to a special "injection helper" routine. This can be done, for example, by modifying the program counter that was saved on the stack when the interrupt first occurred. In the example given, the injection helper modifies the beginning instruction (s) of the original clock interrupt handler back to the branch instruction to the fault injection routine. Once the injection helper routine has modified the original clock interrupt handler to branch to the fault injection routine, it restores the state of the originally running program and passes control back to it, for example, by using the information that was saved on the stack.

As will now be appreciated, a number of ways have been discussed as to how a fault injection routine can be attached to a clock interrupt handler in systems having a variety of different CPU types and operating system configurations. Attention will now be turned to triggering the fault injection. In one example, a fault injection routine is triggered each time the clock interrupt occurs. Once the fault injection routine is triggered, it has to determine which action should be taken under its control. In one example, a variety of predefined faults are made available for selection at the time of triggering. In another example, the particular fault to be injected is loaded into memory either before, but preferably during normal operation of the system being tested. For example, the particular fault, what ever form it may take, is loaded into a predefined memory location. In one example, a simple change of a single bit of data can indicate that normal (i.e. "inject no faults") operation is now to be altered with reference to the previously assigned memory location. If a different fault is to be subsequently injected, the new fault injection data would have to be loaded into memory in place of the previous fault injection data, and provision would have to be made to point to the new fault injection data and the appropriate time.

According to one aspect of the present invention, there are three possibilities for defining the type of fault to be injected, referred to herein as a static definition, a dynamic definition, and a program injection definition. In the static fault definition embodiment, the type of fault is entirely determined by the code that comprises the fault injection routine. In the dynamic definition embodiment, the fault type is determined by examining a selector that is external to the fault injection routine. The selector may be a predetermined memory location, a register in a device peripheral to the CPU, or a specific piece of hardware, such as a dipswitch or a jumper. [Note: This paragraph mentioned static and dynamic, but did not elaborate at all on program injection. Does it need to, or is the coverage of program injection in paragraph 43 sufficient?]

In the static fault definition embodiment, a user such as the programmer who wrote the fault injection routine specifies the fault types that will be injected, and when they will be injected. As an example, consider a system where the clock ticks every 10 milliseconds, and it is desired to inject one of 3 different faults once each second. With reference to the flowchart represented in FIG. 5 the actions of the fault injection routine with static fault definition are represented. The first decision box 510 makes the determination as to whether a full second has elapsed since the last fault was injected. In the example illustrated, the clock interrupts are occurring every 10 milliseconds, and accordingly it takes 100 interrupts to mark the passing of a full second. The second decision box 512 decides which of three different possible fault types should be injected. This decision is based on the value of a counter maintained by the fault injection routine. After each fault is injected the counter is incremented modulo 3, so it can take on only one of three values, namely 0, 1, or 2. Depending upon the stored value, control is passed to one of the steps 514, 516, 518.

Figure 6:
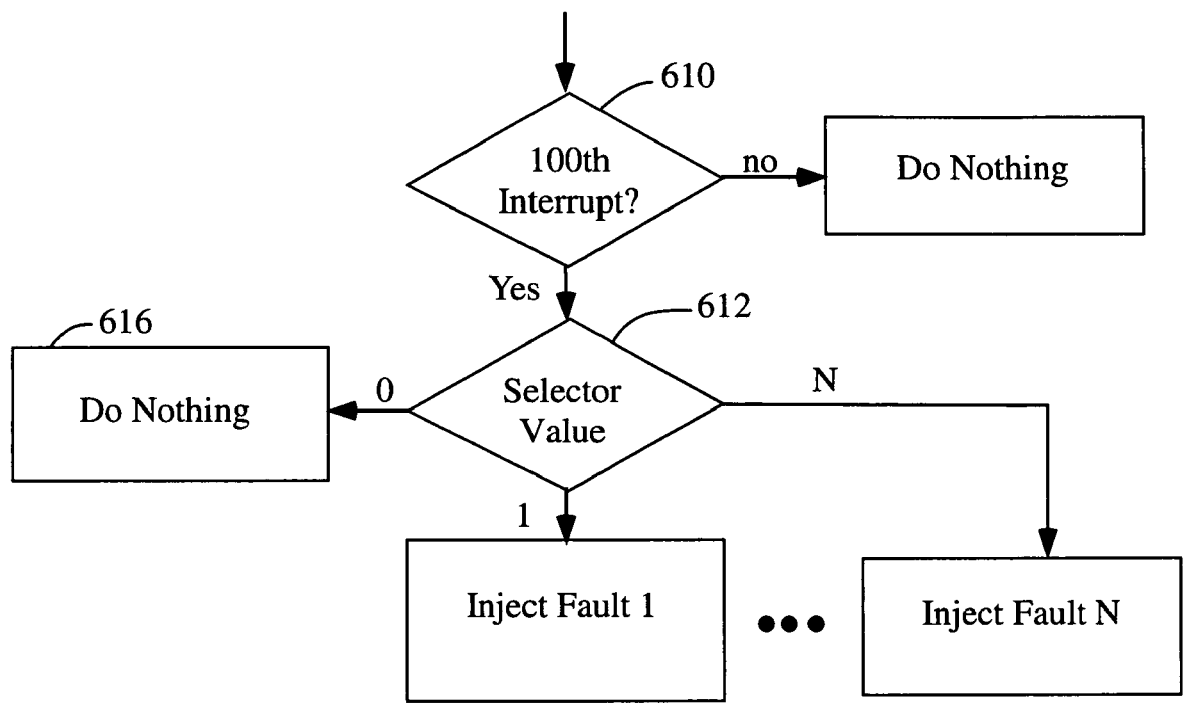
FIG. 6 is an exemplary process flow of another fault injection routine.

Referring now to the dynamic fault definition embodiment, reference is made to the flowchart represented FIG. 6. Dynamic fault definition allows a source external to the fault injection routine to make the determination of which faults should be injected and when they should be injected. One example of such an external source is a person testing the system. Another example is an automated test system that cycles through a list of different faults and automatically requests their injection. In both examples, the fault injection routine examines a fault selector each time the clock interrupt occurs (or every Nth time, if it is desirable to slow down the rate of injection and/or to reduce clock burden). The selector can be anything that the CPU can access. Examples include a memory location, a register in a peripheral device (such as UARTs, Ethernet controllers, USB controllers, Inter-IC bus controllers, dual-ported memory, and similar devices, even those connected through a hub, bus, or network). A hardware component such as a dipswitch, jumper or rotary switch could also be employed.

Figure 5:
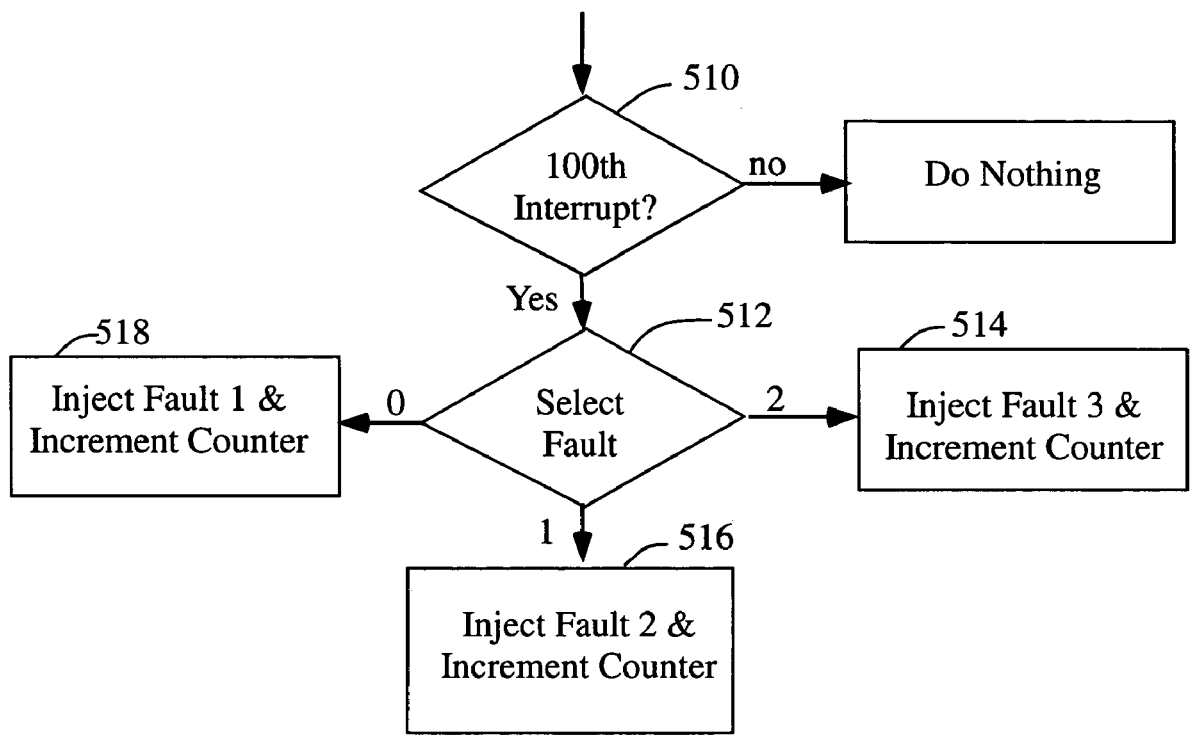
FIG. 5 is an exemplary process flow of a fault injection routine.

In the example shown in FIG. 5, it is desired to use dynamic fault insertion, and to inject a fault every second. The first decision box 610 makes the determination as to whether a full second has elapsed since the last fault was injected. In the example illustrated, the clock interrupts are occurring every 10 milliseconds, and accordingly it takes 100 interrupts to mark the passing of a full second. The second decision box 612 decides which of the different possible fault types should be injected. At least one of the selector values (value 0 in the above flow chart) is reserved to indicate that no fault is to be injected, as indicated in step 616. This allows the system to run normally, even though the fault injection routine is installed and the selector may be active. In one example, it is assumed desirable to automatically inject 100 different faults into this system from an automated test system. Further, it is assumed in this example that the connection between the automated test system and the system to be tested is through an RS-232 serial port.

To inject the 100 faults, the automated test system, in one example, sends characters 1 through 100 over the serial link, spaced appropriately in time, for delivery to the serial port on the system under test. The system under test, which is running the fault injection routine, will examine the serial port register each clock tick (or every Nth clock tick, with N=100 in the above example) to see if a new character has been received. If a character has been received, then the value of that character (1 to 100) is used to select the particular fault to be injected. In one example, the character is used as an index into a table of faults (i.e. a table with values corresponding to each of a plurality of different, respective faults). If desired, the index into the table can be provided by adding an offset value to a reference memory location, such as the memory location where the table is stored. Numerous other known implementations will work equally well.

Program Injection Fault definition entails loading the actual instructions and data necessary to define and generate the faults to be injected. This embodiment is similar to the dynamic fault definition embodiment in that the fault injection routine gets external information prior to performing the injection, but in the program injection fault definition embodiment, rather than using the information to select from a list of predetermined faults, the information is the actual set of CPU instructions and data required to inject the fault. This set of instructions may be sent in serially through a mechanism similar to the selector used for the dynamic fault injection, or the instructions may be loaded into memory and a signal sent, for example through one of the dynamic fault injection selector codes, telling the fault injection routine to execute them.

Fault generation is the act of injecting a fault into the system. There is a distinction between a fault having been injected and a fault manifesting itself as a failure. For example, a fault may be injected by corrupting part of the system's program in memory. The act of corrupting the program in memory constitutes the injection of the fault. However, the fault is not expected to manifest itself as a failure until that corrupted portion of the program is operated on by the software system or is otherwise executed, which may occur right away, at a later time after some delay, or perhaps not at all within a reasonable time frame.

The specific faults to be generated depend on the particular system and the goals of the injection. If the goal were to create a more robust system, then faults that are expected to have the greatest impact on system behavior would be injected to see how the system responds and to identify weaknesses in the system's detection and recovery algorithms. If the goal is to compare two different systems, then a more generic set of faults would be injected into each system and the results compared. A third possible goal is to determine the percentage of faults that the system can detect and recover from. In this case, the ability to inject a large number and variety of faults is important.

Regardless of the specific goals for performing fault injection, the types of faults that may be injected include faults associated with both software and hardware failures. For example, software-related faults to be addressed can include: loss of a clock cycle or one or more clock ticks (disable the clock tick interrupt handler); data corruption; program corruption; stack corruption; heap corruption; and data structure misconfiguration (such as linked lists).

In addition, hardware faults can be simulated, such as: lost interrupts; invalid device states—e.g. were a device is reset without re-initialization; bad device status; artificially generating fault interrupts; and Memory Management Unit (MMU) failures. Further, other faults may be addressed, including: timeouts; lost messages; locked semaphores; protocol failures; resource exhaustion; logic errors; process and task deaths; database corruption; invalid accesses (access non-existent memory, for example); file system errors; interrupt vector corruption; data buffer over and under-runs; null pointer accesses; and memory mapping failures (for CPUs with MMUs).

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium of the storage device 101. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method comprising the steps of:
storing a fault injection routine in at least one predefined memory location;
modifying an original clock interrupt service routine of an operating system to create a modified clock interrupt service routine that comprises a pointer to the at least one predefined memory location;
retrieving, from an interrupt vector table of the operating system, a clock vector pointer to the modified clock interrupt service routine;
executing the modified clock interrupt service routine;
transferring control to the fault injection routine through employment of the pointer to the at least one predefined memory location in the modified clock interrupt service routine;
executing the fault injection routine.

2. The method of claim 1 wherein the operating system comprises part of a normally operating software system, and the fault injection routine is executed during normal operation of the software system.

3. The method of claim 2 wherein the fault injection routine injects a fault in the normally operating software system at a predetermined time, and the fault is operated on by the software system at a later time.

4. The method of claim 3 wherein the fault is injected via a subroutine of the fault injection routine selected from a plurality of subroutines.

5. The method of claim 4 wherein the plurality of subroutines includes a null fault subroutine devoid of fault data.

6. The method of claim 5 wherein injection of the null fault subroutine causes loss of at least one clock tick.

7. The method of claim 1 wherein the fault injection routine comprises at least one operational code statement.

8. The method of claim 7 wherein the fault injection routine further comprises at least one data statement.

9. The method of claim 1 wherein said fault injection routine comprises a triggering part, a fault-defining part and a fault-generating part.

10. A method comprising the steps of:
   storing in memory, a plurality of fault injection subroutines for injecting different, respective faults;
   storing in memory, a fault injection routine for executing at least one of the plurality of fault injection subroutines;
   selecting at least one of the plurality of fault injection subroutines;
   modifying an original clock interrupt service routine of an operating system to create a modified clock interrupt service routine that comprises a pointer to the fault injection routine;
   retrieving, from an interrupt vector table of the operating system, a clock vector pointer to the modified clock interrupt service routine;
   executing the modified clock interrupt service routine;
   transferring control to the fault injection routine through employment of the pointer to the at least one predefined memory location in the modified clock interrupt service routine;
   executing the fault injection routine and the at least one selected fault injection subroutine.

11. The method of claim 10 further comprising the step of providing a table with values corresponding to each of the different, respective faults and the step of selecting comprises the step of retrieving a value from the table.

12. The method of claim 10 further comprising the step of providing a reference memory location and an offset value and the step of providing a pointer comprises the step of adding the offset value to the reference memory location to thereby specify the memory location of the selected fault injection routine.

13. The method of claim 10 wherein the modified clock interrupt service routine diverts operation of a CPU and the fault injection routine comprises at least one of an operational code statement, a data statement or a processable statement that are processed by the CPU when said fault injection routine is executed.

14. The method of claim 10 wherein the modified clock interrupt service routine diverts operation of a CPU and one of the plurality of fault injection routines returns operational control from the modified clock interrupt service routine, without injecting a fault.

15. The method of claim 10 wherein the modified clock interrupt service routine normally returns with an indication that the modified clock interrupt service routine has occurred and one of the plurality of fault injection routines returns operational control from the modified clock interrupt service routine without an indication that the modified clock interrupt service routine has occurred, thereby simulating a loss of a system clock.

16. The method of claim 10 wherein a value accessed via a peripheral device determines which of the fault injection subroutines is to be executed.

17. The method of claim 16 wherein the value indicates whether or not a fault is to be injected.

18. The method of claim 10 wherein a value accessed via a register of an inter-integrated circuit device determines which of the fault injection subroutines is to be executed.

19. The method of claim 18 wherein the step of executing the fault injection routine comprises the step of injecting fault instructions into individual servers from the inter-integrated circuit device.

20. The method of claim 18 wherein the step of executing the fault injection routine comprises the step of tapping into a bus connected to the inter-integrated circuit device and directing faults to a server on the inter-integrated circuit bus.

21. The method of claim 10 wherein a value stored in a set of single-bit locations determines which of the fault injection routines are to be executed.

22. The method of claim 21 wherein the each bit of the single-bit locations is associated with a specific fault to be injected.

23. The method of claim 21 wherein one of the single bit locations comprises an unused bit on an I/O device.

24. The method of claim 10 wherein the step of selecting at least one of the plurality of fault injection subroutines comprises the step of selecting the at least one of the plurality of fault injection subroutines with a pseudo-random number generator.

25. The method of claim 1, further comprising the step of:
   causing a clock interrupt within the operating system through employment of any one of a timing means, fixed interval circuit, and clock interrupt source to repeatedly and reliably call the modified clock interrupt service routine during normal operation of the operating system.

26. The method of claim 25, wherein the step of causing the clock interrupt comprises the step of:
   establishing a defined operating cycle or clock cycle through employment of the clock interrupt.

27. The method of claim 26, wherein the step of establishing the defined operating cycle or clock cycle comprises the step of:
   providing a system-wide standard timing for software and hardware components associated with the operating system based on the defined operating cycle or clock cycle.

28. The method of claim 10, further comprising the step of:
   causing a clock interrupt within the operating system through employment of any one of a timing means, fixed interval circuit, and clock interrupt source to repeatedly and reliably call the modified clock interrupt service routine during normal operation of the operating system.

29. The method of claim 28, wherein the step of causing the clock interrupt comprises the step of:
   establishing a defined operating cycle or clock cycle through employment of the clock interrupt.

30. The method of claim 29, wherein the step of establishing the defined operating cycle or clock cycle comprises the step of:
   providing a system-wide standard timing for software and hardware components associated with the operating system based on the defined operating cycle or clock cycle.

* * * * *